(12) United States Patent
Saito et al.

(10) Patent No.: US 9,835,325 B2
(45) Date of Patent: Dec. 5, 2017

(54) EVAPORATIVE GAS GENERATING DEVICE, METHOD FOR PRODUCING EVAPORATIVE GAS, HYDROGEN BROMIDE PRODUCTION DEVICE, AND METHOD FOR PRODUCING HYDROGEN BROMIDE

(71) Applicant: SHOWA DENKO K.K., Minato-ku, Tokyo (JP)

(72) Inventors: Hirohide Saito, Tokyo (JP); Masaru Wada, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 400 days.

(21) Appl. No.: 14/390,657

(22) PCT Filed: Mar. 27, 2013

(86) PCT No.: PCT/JP2013/002092
§ 371 (c)(1),
(2) Date: Oct. 3, 2014

(87) PCT Pub. No.: WO2013/161183
PCT Pub. Date: Oct. 31, 2013

(65) Prior Publication Data
US 2015/0056128 A1    Feb. 26, 2015

(30) Foreign Application Priority Data
Apr. 26, 2012 (JP) .................................. 2012-101749

(51) Int. Cl.
*B01B 1/00* (2006.01)
*B01D 1/00* (2006.01)
(Continued)

(52) U.S. Cl.
CPC ................ *F22B 1/08* (2013.01); *B01B 1/005* (2013.01); *B01D 1/0052* (2013.01); *B01J 4/02* (2013.01);
(Continued)

(58) Field of Classification Search
CPC . B01D 1/0052; B01J 4/02; B01J 10/00; B01J 12/00; B01B 1/005
(Continued)

(56) References Cited

U.S. PATENT DOCUMENTS 2,491,732 A * 12/1949 Hawkinson ........... C01B 15/013
159/48.2
3,052,220 A * 9/1962 Hany ........................ F22B 9/04
122/167

(Continued)

FOREIGN PATENT DOCUMENTS

CN     101713491 A    5/2010
JP     53-63300 A     6/1978
(Continued)

OTHER PUBLICATIONS

International Search Report of PCT/JP2013/002092 dated Jun. 25, 2013 [PCT/ISA/210].

(Continued)

*Primary Examiner* — Jonathan Miller
(74) *Attorney, Agent, or Firm* — Sughrue Mion, PLLC (57) ABSTRACT

An evaporative gas generating device and a method for producing evaporative gas. A hydrogen bromide production device and a method for producing hydrogen bromide are also disclosed. The hydrogen bromide production device is provided with an evaporative gas generating device (1) that generates bromine gas, and a reactor (3) that reacts the bromine gas with hydrogen gas to form hydrogen bromide. The evaporative gas generating device (1) is provided with a container (10) that accommodates liquid bromine (B), and heating jackets (35, 36) that supply heat to a wall surface of the container (10), and heat and evaporate the liquid bromine (B) within a liquid accommodating part (15) of the container (Continued)

(10) to raise the temperature of the bromine gas within the evaporative gas accommodating part (16).

12 Claims, 2 Drawing Sheets

(51) Int. Cl.
*F22B 1/08* (2006.01)
*C01B 7/09* (2006.01)
*B01J 10/00* (2006.01)
*B01J 4/02* (2006.01)
*F17C 11/00* (2006.01)
*B01J 12/00* (2006.01)

(52) U.S. Cl.
CPC ............ *B01J 10/00* (2013.01); *B01J 12/00* (2013.01); *C01B 7/093* (2013.01); *F17C 11/005* (2013.01); *B01J 2219/00182* (2013.01); *Y02E 60/321* (2013.01)

(58) Field of Classification Search
USPC ............................... 159/26.1, 27.1; 422/305
See application file for complete search history.

(56) References Cited

U.S. PATENT DOCUMENTS

| | | | | |
|---|---|---|---|---|
| 3,610,880 A | * | 10/1971 | Kreiberg | ............. A61M 11/041 392/406 |
| 3,637,978 A | * | 1/1972 | Corbett | .................... F24H 1/00 128/203.17 |
| 3,988,427 A | | 10/1976 | Bossler, III et al. | |
| 4,369,097 A | | 1/1983 | Nezu et al. | |

FOREIGN PATENT DOCUMENTS

| | | |
|---|---|---|
| JP | 57-65304 A | 4/1982 |
| JP | 64-083663 A | 3/1989 |
| JP | 3-26337 U | 3/1991 |
| JP | 2006-111487 A | 4/2006 |
| JP | 2007-165239 A | 6/2007 |

OTHER PUBLICATIONS

Communication dated Mar. 18, 2016, issued by the European Patent Office in corresponding European Application No. 13780526.3.
English translation of the International Preliminary Report on Patentability and Written Opinion of the International Searching Authority dated Nov. 6, 2014 for corresponding International Application No. PCT/JP2013/002092.

* cited by examiner

EVAPORATIVE GAS GENERATING DEVICE, METHOD FOR PRODUCING EVAPORATIVE GAS, HYDROGEN BROMIDE PRODUCTION DEVICE, AND METHOD FOR PRODUCING HYDROGEN BROMIDE

CROSS REFERENCE TO RELATED APPLICATIONS

This application is a National Stage of International Application No. PCT/JP2013/002092, filed Mar. 27, 2013, claiming priority based on Japanese Patent Application No. 2012-101749, filed Apr. 26, 2012, the contents of all of which are incorporated herein by reference in their entirety.

TECHNICAL FIELD

The present invention relates to an evaporative gas generating device that heats and evaporates a liquid to generate evaporative gas and a method for producing evaporative gas. Additionally, the invention relates to a hydrogen bromide production device in which bromine ($Br_2$) gas and hydrogen ($H_2$) gas react to form hydrogen bromide (HBr), and a method for producing hydrogen bromide.

BACKGROUND ART

Although various methods for producing hydrogen bromide are known, a method for reacting bromine gas and hydrogen gas is industrially used. For this reason, usually, hydrogen bromide production facilities are provided with an evaporative gas generating device that heats and evaporates liquid bromine to generate evaporative gas of the bromine, supplies the obtained bromine gas to a reactor, reacts the bromine gas with hydrogen gas, and produces hydrogen bromide.

In order to efficiently produce the hydrogen bromide in such hydrogen bromide production facilities, it is always necessary to stably supply a fixed amount of bromine gas to the reactor. Accordingly, it is necessary to control the amount of evaporization of the liquid bromine in the evaporative gas generating device.

In the related art, generally, a method for adjusting the amount of evaporization of the liquid bromine depending on the intensity of the heat applied to the liquid bromine or heating time in the evaporative gas generating device is used. For example, a method for repeating switching on and off a power source of an electric heater that heats a container in which the liquid bromine is accommodated, thereby adjusting the amount of evaporization of the liquid bromine, is used.

However, in the method for repeating switching on and off the power source of the electric heater to adjust the amount of evaporization of the liquid bromine, the amount of the heat applied to the liquid bromine is not easily kept fixed, and there is a concern that a minute fluctuation may occur. Therefore, a minute fluctuation occurs also in the amount of evaporization of the liquid bromine, and it is not easy to always generate a fixed amount of bromine gas to stably supply to the reactor.

For example, if the technique described in PTL 1 is used, it is possible to control the amount of evaporization of the liquid bromine approximately constantly. However, even if it is possible to constantly control the amount of evaporization of the liquid bromine, there is a concern that the temperature of the evaporative gas of the bromine may fall in the process of being sent from the evaporative gas generating device to the reactor, and the evaporative gas may be liquefied (condensed). If the liquefaction of the bromine gas occurs, there is a concern that the amount of the bromine gas supplied to the reactor may become less than a desired setting value.

Therefore, in order to prevent the liquefaction of the bromine gas, a technique (hereinafter referred to as "post-superheating") of turning the evaporative gas into superheated steam in the process of being sent from the evaporative gas generating device to the reactor is known. For example, there is a technique of sending the bromine gas from the evaporative gas generating device to a post-superheating device installed between the evaporative gas generating device and the reactor to heat the bromine gas, and supplying the bromine gas to the reactor after raising the temperature of bromine gas, or heating a pipe that sends the bromine gas from the evaporative gas generating device to the reactor, thereby preventing the liquefaction of the bromine gas in the process of being sent from the evaporative gas generating device to the reactor.

CITATION LIST

Patent Literature

PTL 1: JP2007-165239A

SUMMARY OF THE INVENTION

Technical Problem

However, there is a problem in that the post-superheating, such as the installation of the post-superheating device or the heating of the pipe, causes the cost to rise.

Thus, an object of the invention is to solve the related-art problems as described above, and an object thereof is to provide an evaporative gas generating device and a method for producing evaporative gas capable of stably generating and supplying a fixed amount of evaporative gas without performing post-superheating. Additionally, another object of the invention is to provide a hydrogen bromide production device and a method for producing hydrogen bromide that efficiently form hydrogen bromide from bromine gas and hydrogen gas without performing post-superheating of bromine gas.

Solution to Problem

In order to solve the above problems, the aspects of the invention consist of the following configurations. That is, the evaporative gas generating device related to an aspect of the invention includes a container provided with a liquid accommodating part that accommodates a liquid, and an evaporative gas accommodating part that is continuously provided above the liquid accommodating part and introduces evaporative gas formed by the liquid within the liquid accommodating part being evaporated; and a heating unit that heats both the liquid accommodating part and the evaporative gas accommodating part to evaporate the liquid within the liquid accommodating part and raises the temperature of the evaporative gas within the evaporative gas accommodating part.

In the evaporative gas generating device, the container may have a double structure including two bottomed tubular members, a lower part of a space formed between an inside bottomed tubular member and an outside bottomed tubular member forms the liquid accommodating part, and the upper part of the space forms the evaporative gas accommodating part.

Additionally, the heating unit may be disposed on at least one of the inside of the inside bottomed tubular member or the outside of the outside bottomed tubular member. Moreover, the heating unit may be a heating jacket through which a heat medium circulates. Moreover, the heating jacket may have a supply port for the heat medium at an upper end and has a discharge port for the heat medium at a lower end. Moreover, the heat medium may be steam. Moreover, the evaporative gas generating device may further include a drainage part that discharges the water formed by liquefaction of the steam from the heating jacket.

Moreover, the evaporative gas generating device may further include a liquid introduction part that introduces the liquid into the liquid accommodating part; a discharge part that discharges the evaporative gas formed by the liquid being evaporated from the evaporative gas accommodating part; a liquid level detecting unit that detects the height of a liquid level of the liquid within the container; and a liquid level control unit that controls the liquid introduction part on the basis of a detection result of the liquid level detecting unit to adjust the amount of introduction of the liquid into the liquid accommodating part so that the height of the liquid level falls within a certain range. Moreover, the liquid may be bromine.

Additionally, a method for producing evaporative gas related to another aspect of the invention includes an evaporation step of heating a liquid accommodated in a liquid accommodating part to evaporate the liquid to generate evaporative gas while controlling the height of a liquid level of the liquid falls within a certain range; and an evaporative gas heating step of introducing and heating the evaporative gas into the evaporative gas accommodating part provided continuously from the liquid accommodating part.

In the method for producing evaporative gas, the liquid may be bromine.

Moreover, a hydrogen bromide production device related to still another aspect of the invention includes the evaporative gas generating device; a hydrogen gas supply unit that supplies hydrogen gas; and a reactor that reacts bromine gas supplied from the evaporative gas generating device with hydrogen gas supplied from the hydrogen gas supply unit to form hydrogen bromide.

Moreover, a method for producing hydrogen bromide related to a still further aspect of the invention includes an evaporation step of heating liquid bromine accommodated in a liquid accommodating part to evaporate liquid bromine to generate bromine gas while controlling the height of a liquid level of the liquid bromine within a certain range; an evaporative gas heating step of introducing and heating the bromine gas into the evaporative gas accommodating part provided continuously from the liquid accommodating part; and a reaction step of reacting the bromine gas heated in the evaporative gas heating step with hydrogen gas to form hydrogen bromide.

Advantageous Effects of Invention

The evaporative gas generating device and the method for producing evaporative gas related to the invention are able to stably generate and supply a fixed amount of evaporative gas without performing post-superheating. Additionally, the hydrogen bromide production device and the method for producing hydrogen bromide related to the invention are able to efficiently form hydrogen bromide without performing post-superheating of bromine gas.

DESCRIPTION OF EMBODIMENTS

Figure 1:
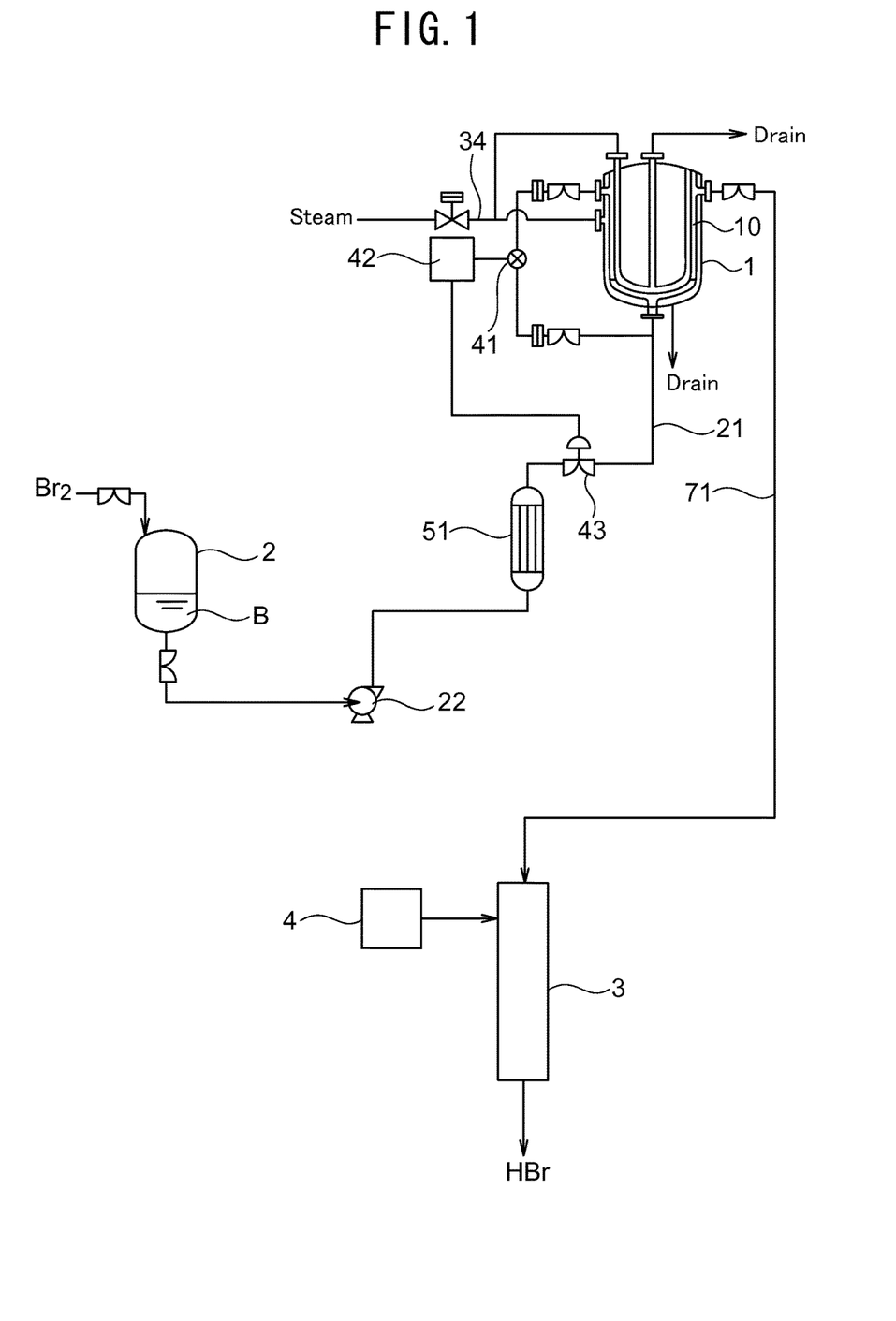
FIG. 1 is a view illustrating an embodiment of an evaporative gas generating device and a hydrogen bromide production device related to the invention.

An embodiment of an evaporative gas generating device, a method for producing evaporative gas, a hydrogen bromide production device, and a method for producing hydrogen bromide related to the invention will be described in detail, referring to the drawings. FIG. 1 is a view illustrating the evaporative gas generating device and the hydrogen bromide production device of the present embodiment, and FIG. 2 is an enlarged cross-sectional view of the evaporative gas generating device.

Figure 2:
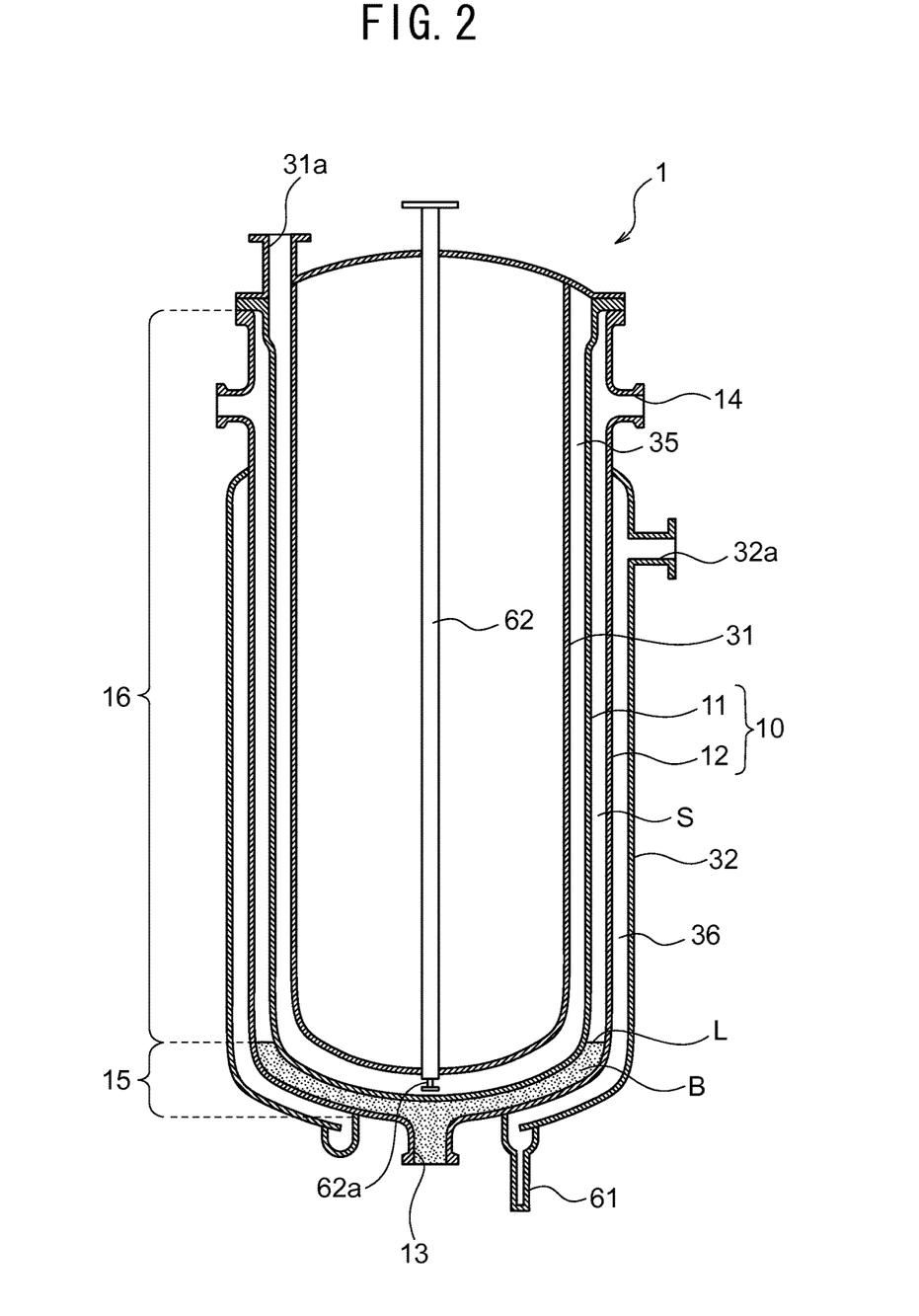
FIG. 2 is an enlarged cross-sectional view of the evaporative gas generating device.

Although the evaporative gas generating device of FIG. 2 is a device that heats and evaporates a liquid to generate evaporative gas and is applicable to various liquids, such as water and an organic solvent, an example in which the evaporative gas generating device is applied to bromine which is a corrosive liquid will be described below. Additionally, since the evaporative gas generating device that generates bromine gas is preferably available for a hydrogen bromide production device, an example in which the evaporative gas generating device of FIG. 2 is applied to the hydrogen bromide production device will be described.

<Regarding Configuration of Hydrogen Bromide Production Device Related to Present Embodiment>

The hydrogen bromide production device illustrated in FIG. 1 is provided with a bromine tank 2 that stores liquid bromine B, an evaporative gas generating device 1 that heats and evaporates the liquid bromine B to generate bromine gas, a hydrogen gas supply unit 4, such as a hydrogen cylinder, that is filled with hydrogen gas, a reactor 3 that reacts the bromine gas supplied from the evaporative gas generating device 1 with the hydrogen gas supplied from the hydrogen gas supply unit 4 to form hydrogen bromide.

The evaporative gas generating device 1 is provided with a container 10 that accommodates the liquid bromine B, a pipe 21 (the pipe 21 and a valve 43 to be described below are corresponding to a liquid introduction part that is a constituent feature of the invention) that introduces the liquid bromine B into the container 10 from the bromine tank 2, and heating jackets 35 and 36 that supply heat to a wall surface of the container 10.

First, the structure of the container 10 will be described, referring to FIG. 2. The container 10 has a double structure consisting of two bottomed tubular members of an inside bottomed tubular member 11 and an outside bottomed tubular member 12. Bottom surfaces of the inside bottomed tubular member 11 and the outside bottomed tubular member 12 form a convex surface that protrudes downward. Since this double structure is a structure where the inside bottomed tubular member 11 is housed inside the outside bottomed tubular member 12, a space S is provided between an inner surface of the outside bottomed tubular member 12 and an outer surface of the inside bottomed tubular member 11.

In other words, the container 10 has a bottom part of the double structure, and a tube part of the double structure that rises upward from a peripheral edge portion of the bottom part, and gaps formed by the double structure of the bottom part and the tube part that are continuously connected with each other to form the space S.

Also, since an upper end of the inside bottomed tubular member 11 and an upper end of the outside bottomed tubular member 12 are connected to each other, an upper end of the space S is closed.

A supply port 13 is formed at a substantially central part of the bottom surface (convex surface) of the outside bottomed tubular member 12, and the pipe 21 that introduces the liquid bromine B is connected to the supply port 13. As illustrated in FIG. 1, the pipe 21 is connected to the bromine tank 2 that stores the liquid bromine B, and a pump 22 disposed in the middle of the pipe 21 is driven whereby the liquid bromine B is introduced into the container 10 from the bromine tank 2 and is accommodated in a lower part 15 (gap formed at the bottom part) of the space S. In addition, the lower part 15 of the space S in which the liquid bromine B is accommodated is corresponding to a liquid accommodating part that is a constituent feature of the invention.

The inside and the outside of the container 10, that is the inside of (a side opposite to a side that faces the space S) the inside bottomed tubular member 11 and the outside of (the side opposite to the side that faces the space S) the outside bottomed tubular member 12 is equipped with heating jackets 35 and 36 that supply heat to the wall surface (the inner surface of the inside bottomed tubular member 11 and the outer surface of the outside bottomed tubular member 12) of the container 10. Tubular members 31 and 32 having shapes similar to the inside bottomed tubular member 11 and the outside bottomed tubular member 12 are coaxially disposed inside the inside bottomed tubular member 11 and outside the outside bottomed tubular member 12. A quadruple structure is made by the two tubular members 31 and 32 (hereinafter, the tubular member 31 inside the inside bottomed tubular member 11 is referred to as an "inner sheath member", and the tubular member 32 outside the outside bottomed tubular member 12 is referred to as an "outer sheath member"), the inside bottomed tubular members 11, and the outside bottomed tubular member 12.

Spaces are formed between an inner surface of the outer sheath member 32 and the outer surface of the outside bottomed tubular member 12 and between the inner surface of the inside bottomed tubular member 11 and an outer surface of the inner sheath member 31, respectively, and steam that is a heat medium is supplied from a steam pipe 34 to such spaces, whereby the heating jackets 35 and 36 are constituted. Then, heat is supplied from the heating jackets 35 and 36 to the inner surface of the inside bottomed tubular member 11 and the outer surface of the outside bottomed tubular member 12, and is provided for heating of the liquid bromine B and the bromine gas within the container 10.

In addition, the whole inner surface of the inside bottomed tubular member 11 is covered with the heating jacket 35. Additionally, a portion of the outer surface of the outside bottomed tubular member 12, that is below a position where a discharge port 14 (corresponding to a discharge part that is a constituent feature of the invention) for discharging the bromine gas is formed and that is except for the supply port 13 provided in the bottom surface of the outside bottomed tubular member 12 and its peripheral portion, is covered with the heating jacket 36.

Although the liquid bromine B within the liquid accommodating part 15 is evaporated through heating using the heating jackets 35 and 36 to form bromine gas, this bromine gas rises and moves to an upper part 16 (gap formed in the tube part) where the liquid bromine B is not accommodated, in the space S formed between the inner surface of the outside bottomed tubular member 12 and the outer surface of the inside bottomed tubular member 11. That is, the upper part 16 of the space S where the liquid bromine B is not accommodated is corresponding to an evaporative gas accommodating part that is a constituent feature of the invention. Since the evaporative gas accommodating part 16 is continuously provided above the liquid accommodating part 15, the formed bromine gas is smoothly moved to the evaporative gas accommodating part 16.

Since the inside and the outside of the evaporative gas accommodating part 16, together with the liquid accommodating part 15 continuously connected therewith, are covered with the heating jackets 35 and 36, the bromine gas within the evaporative gas accommodating part 16 is heated and the temperature thereof rises. That is, since the liquid bromine B within the liquid accommodating part 15 is evaporated at a boiling point under the pressure within the container 10, the temperature of the bromine gas immediately after being formed is the boiling point under the pressure, and the bromine gas is heated in the evaporative gas accommodating part 16. Therefore, the bromine gas reaches a temperature equal to or higher than the boiling point under the pressure, and is brought into a superheated state.

Since the bromine gas is continuously formed from the liquid accommodating part 15 and is moved to the evaporative gas accommodating part 16, the bromine gas heated at a temperature equal to or higher than the boiling point under the pressure is forced out by the bromine gas that is newly formed, and is delivered from the discharge port 14 provided at the upper end of the outside bottomed tubular member 12 to the outside of the container 10.

As illustrated in FIG. 2, it is preferable to adopt a configuration in which the internal and external heating jackets 35 and 36 have steam supply ports 31a and 32a at upper ends, respectively, and have steam discharge ports at lower ends, respectively. With such a configuration, the steam introduced into the heating jackets 35 and 36 is first provided for the heating of the bromine gas, is then moved downward, and is provided for the heating of the liquid bromine B. Then, since the steam set to a desired temperature is provided for the heating of the bromine gas, it is possible to reliably raise the temperature of the bromine gas to a superheated state.

Although the steam which is used for the heating of the bromine gas and of which a portion of heat energy is consumed is provided for the heating of the liquid bromine B, since the liquid bromine B is sufficient if the temperature thereof is raised to the boiling point under the pressure, the steam of which a portion of heat energy is consumed may be used.

In this way, by adopting a configuration in which the steam used for the heating of the bromine gas is used for the heating of the liquid bromine B, it is possible to efficiently utilize the heat energy of the steam without waste.

<Regarding Control of Height of Liquid Level of Evaporative Gas Generating Device Related to Present Embodiment>

During the operation of the evaporative gas generating device 1, the liquid bromine B is introduced into the liquid accommodating part 15 at a fixed flow rate so that the amount of evaporation of the liquid bromine B and the amount of supply of the liquid bromine B are balanced. However, the balance may be unsettled from causes, such as the fluctuation of the quantity of heat supplied from the heating jackets 35 and 36, and the height of the liquid level L of the liquid bromine B within the container 10 may fluctuate. Then, since the area of heat transfer related to the heating of the liquid bromine B fluctuates, the amount of evaporation of the liquid bromine B fluctuates, and it is difficult to continuously and stably generate a fixed amount of bromine gas. Thus, the evaporative gas generating device 1 is provided with a mechanism that suppresses the fluctuation of the height of the liquid level L of the liquid bromine B within the container 10, and controls the height of the liquid level L of the liquid bromine B within a certain range.

That is, the evaporative gas generating device 1 is provided with a liquid level sensor 41 (corresponding to a liquid level detecting unit that is a constituent feature of the invention) that detects the height of the liquid level L of the liquid bromine B within the container 10, and a liquid level control unit 42 that controls the valve 43 on the basis of the detection result of the liquid level sensor 41 and adjusts the amount of introduction of the liquid bromine B to the liquid accommodating part 15 so that the liquid level L of the liquid bromine B within the container 10 falls within a certain range.

The liquid level sensor 41 is constituted by, for example, a differential pressure transmitter, and this differential pressure transmitter transmits a detection signal corresponding to a differential pressure between the pressure of the bromine gas within the evaporative gas accommodating part 16 and the pressure within the liquid accommodating part 15 to an arithmetic unit of the liquid level control unit 42. The arithmetic unit of the liquid level control unit 42 calculates the height of the liquid level L of the liquid bromine B from the difference between both the pressures.

That is, since the pressure within the liquid accommodating part 15 is the sum of the pressure of the bromine gas and the fluid pressure of the liquid bromine B, the fluid pressure of the liquid bromine B is calculated by subtracting the pressure of the bromine gas within the evaporative gas accommodating part 16 from the pressure within the liquid accommodating part 15. Then, the height of the liquid level L of the liquid bromine B is calculated from the fluid pressure of the liquid bromine B.

As the liquid level control unit 42 adjusts the opening degree of the valve 43 provided in the pipe 21 on the basis of the height of the liquid level L of the calculated liquid bromine B, the amount of the liquid bromine B introduced into the liquid accommodating part 15 is adjusted and is controlled so that the liquid level L of the liquid bromine B within the container 10 falls within a certain range.

Hence, even when the height of the liquid level L of the liquid bromine B fluctuates slightly, the liquid level control unit 42 adjusts the height of the liquid level L immediately. Thus, the height of the liquid level L of the liquid bromine B is maintained without fluctuating considerably so as to fall within a certain range. Since the heat transfer area related to the heating of the liquid bromine B is kept constant if the height of the liquid level L of the liquid bromine B within the container 10 is controlled so as to fall within a certain range, the fluctuation of the amount of evaporation of the bromine gas is hardly caused, and is enabled to be always kept fixed.

Additionally, according to such a method of controlling the height of the liquid level L, switching on and off the heating does not need to be performed unlike in the related art, and the heating of the container 10 by applying a fixed quantity of heat from the heating jackets 35 and 36 has only to be performed. Thus, a minute fluctuation does not occur easily in the amount of evaporization of the liquid bromine B.

In addition, by changing the height setting value of the liquid level L of the liquid bromine B, the control of rapidly increasing or decreasing the amount of generated gas is also possible if necessary.

The materials that constitute the evaporative gas generating device 1 or the hydrogen bromide production device are not particularly limited, and it is possible to use general materials, such as stainless steel. Here, when the liquid is a corrosive liquid, it is preferable that the parts that come into contact with the liquid or its evaporative gas among the respective parts of the container 10 be made of materials having corrosion resistance against the corrosive liquid. The materials may be selected according to the kinds of corrosive liquids, or corrosiveness. In the case of the present embodiment, since bromine that is a corrosive liquid is handled by the evaporative gas generating device 1, it is preferable to use glass lining as a material. That is, it is preferable that glass lining be used for the inner surface of the outside bottomed tubular member 12, the outer surface of the inside bottomed tubular member 11, and the inner surface of the pipe 21, in the container 10.

Next, a method for generating bromine gas through the evaporative gas generating device 1 and producing hydrogen bromide through the hydrogen bromide production device, using the bromine gas, will be described.

First, by bringing the valve 43 into an open state and driving the pump 22, the liquid bromine B stored in the bromine tank 2 is introduced into the container 10 via the pipe 21, and is accommodated in the liquid accommodating part 15.

In order to reliably heat the bromine gas up to a superheated state in the evaporative gas accommodating part 16, it is necessary to sufficiently ensure the space of the evaporative gas accommodating part 16. Hence, if the height of the space S of the container 10 is used as the basis, it is preferable to design the container 10 so that the liquid level L of the liquid bromine B to be introduced in order to obtain a required amount of evaporative gas is the height position of, for example, 10% from the bottom of the space S (here, excluding the space of the supply port 13). That is, the part to the height position of 10% from the bottom of the space S serves as the liquid accommodating part 15, and the part from the height position of 10% to a top part of the space S serves as the evaporative gas accommodating part 16.

Additionally, If the heat transfer area is used as the basis, it is preferable to design the container 10 so that the part that accounts for, for example, 12% of the total heat transfer area of the heating jackets 35 and 36 serves as the liquid accommodating part 15 for the liquid bromine B introduced in order to obtain a required amount of evaporative gas and the part that accounts for 88% serve as the evaporative gas accommodating part 16.

In addition, for example, after the container 10 is designed, there may be used a method for introducing the liquid bromine B with the amount that the liquid level L is located at the height position of, for example, 10% from the bottom of the space S (here, excluding the space of the supply port 13).

If the container 10 is designed so as to satisfy the numerical conditions as described above, it is possible to reliably heat the bromine gas up to a superheated state in the evaporative gas accommodating part 16, thereby suppressing the subsequent liquefaction. The height of the liquid level L that satisfies such numerical conditions is hereinafter referred to as "reference liquid level height".

In addition, although cases where the size of the space of the liquid accommodating part 15 is 10% when the height of the space S is used as the basis and is 12% when the heat transfer area is used as the basis are illustrated, these are exemplary. When the height of the space S is used as the basis, it is preferable to design the container 10 so that the liquid level L is located at the height position of 1% or more and 15% or less of according to a required amount of evaporative gas, and it is more preferable to design the container 10 so that the liquid level L is located at the height position of 5% or more and 10% or less.

Additionally, when the heat transfer area is used as the basis, it is preferable to design the container 10 so that the part that accounts for 0.4% or more and 28% or less according to a required amount of evaporative gas in the total heat transfer area of the heating jackets 35 and 36 serves as the liquid accommodating part 15, and it is more preferable to design the container 10 so that the part that accounts for 2% or more and 11% or less serves as the liquid accommodating part 15.

In addition, for example, after the container 10 is designed, there may be used a method for introducing the liquid bromine B with the amount that the part that falls within the above numerical range in the total heat transfer area of the heating jackets 35 and 36 serves as the liquid accommodating part 15.

When the liquid bromine B is introduced into the container 10, it is preferable to provide a preheater 51 in the middle of the pipe 21, and introduce the liquid bromine B preheated by the preheater 51 within the container 10. In order to evaporate the liquid bromine B, the container 10 is set to, a temperature of, for example, 80° C. or higher and 100° C. or lower. However, if low-temperature liquid bromine B is introduced into the container, there is a concern that the container 10 may be damaged by a thermal shock resulting from a temperature difference. Particularly, since the damage caused by the thermal shock occurs easily in the glass lining, it is preferable to introduce the liquid bromine B preheated to a temperature (for example, a temperature lower than the temperature of the container 10 and a temperature difference of 0° C. or higher and 80° C. or lower) near the temperature of the container 10. Additionally, in order to prevent the damage caused by the thermal shock, it is preferable to keep the temperature of the liquid bromine B introduced into the container 10 constant.

Next, the liquid bromine B introduced into the liquid accommodating part 15 is heated and evaporated by the heating jackets 35 and 36. It is preferable that the pressure within the space S of the container 10 be 0 MPa or higher and 0.15 MPa or lower in order to efficiently evaporate the liquid bromine B. For example, in the case of 0.15 MPa, the liquid bromine is evaporated at 88° C. The generated bromine gas of 88° C. is moved to the upper evaporative gas accommodating part 16, is heated to a temperature within a range of 90° C. or higher and 95° C. or lower by the heating jackets 35 and 36, and is brought into a superheated state. Then, the bromine gas in this superheated state is delivered from the discharge port 14 to the outside of the container 10.

In addition, it is preferable to provide the heating jackets 35 and 36 with a drainage part that discharges the water, which is formed by the liquefaction of the steam, from the heating jackets 35 and 36. If the liquefied water is accumulated within the heating jacket 35 and 36, sufficient heat is not supplied to the part of the wall surface of the container 10 that comes into contact with water. Therefore, there is a concern that the heating of the liquid bromine B may become insufficient. Hence, it is preferable to sequentially drain the water within the heating jacket 35 and 36 so that a situation where the liquefied water is accumulated within the heating jacket 35 and 36 does not occur.

In the present embodiment, since a bottom part (that is, a bottom part of the outer sheath member 32) of the heating jacket 36 provided outside the outside bottomed tubular member 12 is provided with a drain 61, it is possible to extract the liquefied water. Additionally, a suction pipe 62 that sucks the liquefied water from the bottom part of the heating jacket 35 provided inside the inside bottomed tubular member 11 is provided inside the inner sheath member 31. Since the suction pipe 62 passes through the bottom part of the inner sheath member 31, and a suction port 62a provided at a tip of the suction pipe 62 is disposed in the vicinity of a deepest part within the heating jacket 35, it is possible to suck and extract the liquefied water from the suction port 62a.

Additionally, if the height of the liquid level L of the liquid bromine B fluctuates during the operation of the evaporative gas generating device 1 as mentioned above, it becomes difficult to continuously and stably generate a fixed amount of bromine gas. Hence, in the evaporative gas generating device 1, the bromine gas is generated by evaporating the liquid bromine B while controlling the height of the liquid level L of the liquid bromine B within the container 10 falls within a certain range.

For example, when the liquid level sensor 41 detects that the height of the liquid level L of the liquid bromine B is lower than the reference liquid level height, the liquid level control unit 42 increases the opening degree of the valve 43 according to the degree of the falling of the liquid level L, increases the amount of the liquid bromine B introduced into the liquid accommodating part 15, and raises the liquid level L of the liquid bromine B to the reference liquid level height. On the contrary, when the liquid level sensor 41 detects that the height of the liquid level L of the liquid bromine B is higher than the reference liquid level height, the liquid level control unit 42 decreases the opening degree of the valve 43 according to the degree of the rising of the liquid level L, and decreases the amount of the liquid bromine B introduced into the liquid accommodating part 15. Then, since the amount of evaporation of the liquid bromine B is made larger than the amount of introduction of the liquid bromine B into the liquid accommodating part 15, the liquid level L of the liquid bromine B falls to the reference liquid level height.

In this way, the height of the liquid level L of the liquid bromine B within the container 10 is controlled so as to fall within a certain range with the reference liquid level height as a center. Accordingly, since the heat transfer area related to the heating of the liquid bromine B becomes fixed, the fluctuation of the amount of evaporation of the bromine gas is hardly caused, and is enabled to be always kept fixed.

It is preferable to control the height of the liquid level L of the liquid bromine B within the container 10 to be at a height within the range from a position that is lower than the reference liquid level height as a center by 0.5% of the height of the space S of the container 10 to a position that is higher than the reference liquid level height by 0.5% of the height, and it is more preferable to control the height of the liquid level to be at a height within the range from a position that is lower than the reference liquid level height by 0.2% to a position that is higher than the reference liquid level height by 0.2%.

Subsequently, the bromine gas taken out to the outside of the container 10 is sent to the reactor 3 of the hydrogen bromide production device through a pipe 71. Then, hydrogen bromide is obtained if the bromine gas supplied from the evaporative gas generating device 1 and the hydrogen gas supplied from the hydrogen gas supply unit 4 are reacted within the reactor 3.

Since bromine gas drawn out of the evaporative gas generating device 1 is brought into a superheated state of a temperature higher than a boiling point, it is not necessary to heat the pipe 71 and liquefaction in the pipe 71 does not easily occur if the pipe is simply kept warm. Hence, since the bromine gas of a desired set amount is precisely and stably supplied to the reactor 3, it is possible to efficiently generate the hydrogen bromide. Additionally, since it is not necessary to heat the pipe 71, it is possible to produce the bromine gas or the hydrogen bromide at low costs.

Additionally, since the bromine gas in the superheated state is formed within the evaporative gas generating device 1, it is possible to provide a post-superheating device between the evaporative gas generating device 1 and the reactor 3 to prevent the liquefaction of the bromine gas without raising the temperature of the bromine gas. When substances, such as bromine, having corrosiveness, are handled, the post-superheating device needs to be made of expensive glass lining. If devices made of the glass lining are also provided in addition to the evaporative gas generating device 1, the manufacturing costs of the bromine gas and the manufacturing costs of the hydrogen bromide rise remarkably. However, in the evaporative gas generating device 1 of the present embodiment, it is not necessary to provide the post-superheating device. Thus, it is possible to produce the bromine gas or the hydrogen bromide without being accompanied by a significant increase in cost.

Moreover, according to the present embodiment, since both the heating of the liquid bromine B and the heating of the bromine gas are performed by one device (evaporative gas generating device 1), the heat of the steam that is a heat medium of the heating jackets 35 and 36 is efficiently utilized. For example, as mentioned above, if the steam provided for the heating of the bromine gas moves downward of the heating jackets 35 and 36 and is provided for the heating of the liquid bromine B, the heat energy of the steam is efficiently used without waste (that is, the utilization efficiency of the heat energy is high).

In contrast, when a post-superheating device is separately provided between the evaporative gas generating device and the reactor to post-superheat the bromine gas or when a heating jacket or the like that heats the pipe for sending the bromine gas from the evaporative gas generating device to the reactor is separately provided to post-superheat the bromine gas in the pipe, these amounts of steam for post-superheating are in systems different from the steam for heating the liquid bromine in the evaporative gas generating device, and are separately provided for heating, respectively.

Therefore, even if the steam provided for the heating of the liquid bromine in the evaporative gas generating device and the steam provided for the post-superheating have heat energy that is available for other heating, these amounts of steam are not used but are discarded. Therefore, the utilization efficiency of the heat energy becomes low.

In this way, according to the configuration of the present embodiment, the utilization efficiency of the heat energy of the steam is high. Thus, it is also possible to reduce the manufacturing costs of the bromine gas or the hydrogen bromide from this perspective.

In addition, the present embodiment shows an example of the invention, and the invention is not limited to the present embodiment. For example, in the present embodiment, a differential pressure type liquid level sensor is used as the liquid level sensor 41. However, the type of the liquid level sensor is not particularly limited, and it is possible to use general liquid level sensors, of a float type, an ultrasonic type, a capacitance type, and the like.

Additionally, in the present embodiment, although the heating jackets 35 and 36 are provided both inside and outside the container 10, and it is also possible to provide a heating jacket only on any one side. However, if the heating jackets are provided both inside and outside the container 10, the heat transfer area becomes doubled. Thus, it is possible to more precisely and efficiently control the amount of evaporation of the liquid bromine B.

Moreover, although an example in which steam is used as the heat medium of the heating jackets 35 and 36 has been described in the present embodiment, it is possible to use general heat media, in which the type of the heat medium is not limited to steam. For example, gaseous heat media other than steam may be used, and liquid heat media, such as oil, may be used. Moreover, although an example in which the heating jackets are used as the heating unit that heats the liquid bromine B and the bromine gas within the container 10 has been described in the present embodiment, the type of the heating unit is not limited to the heating jackets. For example, it is also possible to use an electric heater and an infrared-heating device.

REFERENCE SIGNS LIST

1: EVAPORATIVE GAS GENERATING DEVICE
3: REACTOR
4: HYDROGEN GAS SUPPLY UNIT
10: CONTAINER
11: INSIDE BOTTOMED TUBULAR MEMBER
12: OUTSIDE BOTTOMED TUBULAR MEMBER
14: DISCHARGE PORT
15: LIQUID ACCOMMODATING PART
16: EVAPORATIVE GAS ACCOMMODATING PART
21: PIPE
31: INNER SHEATH MEMBER
31*a*: STEAM SUPPLY PORT
32: OUTER SHEATH MEMBER
32*a*: STEAM SUPPLY PORT
35, 36: HEATING JACKET
41: LIQUID LEVEL SENSOR
42: LIQUID LEVEL CONTROL UNIT
43: VALVE
B: LIQUID BROMINE
L: LIQUID LEVEL
S: SPACE

The invention claimed is:

1. An evaporative gas generating device comprising:
a container provided with a liquid accommodating part that accommodates a liquid, and an evaporative gas accommodating part that is continuously provided above the liquid accommodating part and introduces evaporative gas formed by the liquid within the liquid accommodating part being evaporated; and
a heating unit that heats both the liquid accommodating part and the evaporative gas accommodating part to evaporate the liquid within the liquid accommodating part and raises the temperature of the evaporative gas within the evaporative gas accommodating part, wherein the container has a double structure including two bottomed tubular members, a lower part of a space formed between the inside bottomed tubular member and the outside bottomed tubular member forms the liquid accommodating part, and the upper part of the space forms the evaporative gas accommodating part.

2. The evaporative gas generating device according to claim 1,
wherein the heating unit is disposed on at least one of the inside of the inside bottomed tubular member or the outside of the outside bottomed tubular member.

3. The evaporative gas generating device according to claim 1,
wherein the heating unit is a heating jacket through which a heat medium circulates.

4. The evaporative gas generating device according to claim 3,
wherein the heating jacket has a supply port for the heat medium at an upper end and has a discharge port for the heat medium at a lower end.

5. The evaporative gas generating device according to claim 3,
wherein the heat medium is steam.

6. The evaporative gas generating device according to claim 5, further comprising:
a drainage part that discharges the water formed by liquefaction of the steam from the heating jacket.

7. The evaporative gas generating device according to claim 1, further comprising:
a liquid introduction part that introduces the liquid into the liquid accommodating part;
a discharge part that discharges the evaporative gas formed by the liquid being evaporated from the evaporative gas accommodating part;
a liquid level detecting unit that detects the height of a liquid level of the liquid within the container; and
a liquid level control unit that controls the liquid introduction part on the basis of a detection result of the liquid level detecting unit to adjust the amount of introduction of the liquid into the liquid accommodating part so that the height of the liquid level falls within a certain range.

8. The evaporative gas generating device according to claim 1,
wherein the liquid is bromine.

9. A hydrogen bromide production device, comprising:
the evaporative gas generating device according to claim 8;
a hydrogen gas supply unit that supplies hydrogen gas; and
a reactor that reacts bromine gas supplied from the evaporative gas generating device with hydrogen gas supplied from the hydrogen gas supply unit to form hydrogen bromide.

10. A method for producing evaporative gas using the evaporative gas generating device according to claim 1, comprising:
an evaporation step of heating a liquid accommodated in a liquid accommodating part to evaporate the liquid to generate evaporative gas while controlling the height of a liquid level of the liquid within a certain range; and
an evaporative gas heating step of introducing and heating the evaporative gas into the evaporative gas accommodating part provided continuously from the liquid accommodating part.

11. The method for producing evaporative gas according to claim 10,
wherein the liquid is bromine.

12. A method for producing hydrogen bromide using the evaporative gas generating device according to claim 1, comprising:
an evaporation step of heating liquid bromine accommodated in a liquid accommodating part to evaporate liquid bromine to generate bromine gas while controlling the height of a liquid level of the liquid bromine within a certain range;
an evaporative gas heating step of introducing and heating the bromine gas into the evaporative gas accommodating part provided continuously from the liquid accommodating part; and
a reaction step of reacting the bromine gas heated in the evaporative gas heating step with hydrogen gas to form hydrogen bromide.

* * * * *